May 1, 1945.  R. HOWARD  2,374,749

ULTRA-VENTILATED OVEN DRIPPING PAN

Filed May 22, 1943

INVENTOR
RICHARD HOWARD
BY Earl E. Moore
ATTORNEY

Patented May 1, 1945

2,374,749

UNITED STATES PATENT OFFICE 2,374,749

ULTRAVENTILATED OVEN DRIPPING PAN

Richard Howard, Los Angeles, Calif.

Application May 22, 1943, Serial No. 488,011

8 Claims. (Cl. 126—215)

This invention concerns heating devices for all kinds of cooking utensils, pans, pots, and the like used in cooking foods or any other kind of substances. Regardless of where or how the invention is employed, it is designed and arranged so as to catch all the drippings from the cooking utensil and retain them in a manner so that they will not stick to the cooking device, and the device is also arranged so that the utmost advantage is obtained from the heat by directing the heat uniformly on all sides of the cooking utensil. Means are combined with the inventive device for centering the cooking utensil thereon which eliminates all guess work for obtaining the optimum of direct heat advantages.

By taking full advantage of all the benefits of this invention, the heat oven, or any other part of the stove where this invention is employed, will remain clean and not be littered and spotted with grease and other overflows from the cooking utensil, for the drip catcher will retain all the drippings and prevent them from being burnt. A water trough is employed to retain the drippings in a liquid or plastic state so that the drippings will not burn or cause any smoke whatsoever.

The device of this invention keeps a consistent and unblocked heat flowing up and all around any size baking dish used on it with but the very least possible loss of the heat's intensity. To gain this service, many vents and ways are provided to channel the heat through the dripper device. All the direct heat in the stove's oven is utilized because of the fact that the heat is unblocked and remains at a more uniform level temperature. The device has numerous open parts to let the heat flow through it in great volume when large or small dishes are rested upon it. The device has many small heat vents that circle the under edge of the removable parts and this keeps the heat flowing consistently through the dripper device, when any or all the removable parts are in use. By raising the center covering cap with the aid of legs, another way is provided to let the heat flow freely through and between them, to rise up and flow around the baking dish by adding more heat freedom within the oven. This inventive device does not interfere with the oven's heat flow or freedom to any great extent. In that way the device matches up with the finer baking results obtained in today's modern and high tested range known and advertised as "Certified Performance." The same principles of this invention will be beneficial to the cook who uses the electric range.

One of the principal objects of this invention is to present a new and novel heat distributing unit or device that guides and directs the heat of the stove or range in a manner that the heat is evenly dispersed to all sides of the cooking utensil so as to give an even cook and/or bake to the substance being heated.

Another object is to provide an improved heat distributing device combined with a means for catching the drippings from a cooking utensil, the device being simple and sturdy in construction, easy to handle and understand, and economical to manufacture.

Other objects, advantages and features of my invention will appear from the accompanying drawing, the subjoined detailed description, the preamble of these specifications and the appended claims.

Applicant is about to illustrate and describe one of the forms of his invention in order to teach one how to make, and use the same, but it is to be understood that the drawing and description thereof are not to limit the invention in any sense whatsoever, except as limited by the appended claims.

Figure 4:
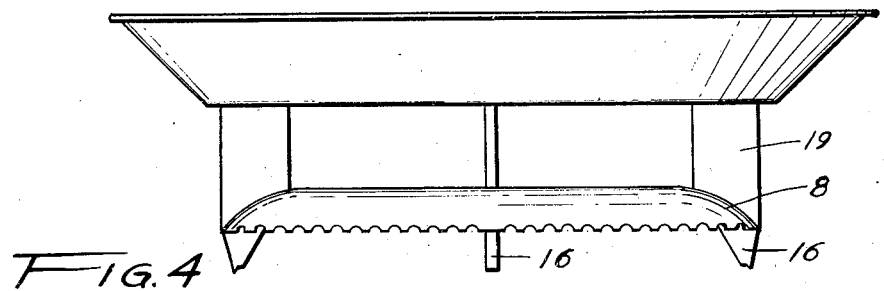
Fig. 4 is also an elevational view of a part of the device.

The reference character 1 indicates a shelf or rest for the inventive device, the same may be a ledge or shelf in an oven, or the top hot plate or portion of an ordinary stove or range. Such shelves or ledges are generally reticulated so as to allow the free upward passage of convective heat. The inventive device or unit, has as a base an annular trough-like pan 2 with the inner slanted wall 3, bottom wall 4, outer slanted wall 5, and lip 6. These parts would ordinarily be formed of a single integral sheet of suitable metal, and die stamped so as to form the neat conical opening 7 through which the hot gases of an oven can freely pass.

Over the base pan 2 is nested a plurality of annular frames or deflectors; since in this particular illustration only three of the frames are used, the bottom one is indicated as 8, the intermediate one as 9, and the top one as 10. These frames are all nested in a manner that they guide the rising heat from the stove shelf directly to the cooking utensil, for instance, the pot 11, and allows a predetermined proportion of the convective heat to slip to the outer sides of the frames and rise along the outer sides of the pot.

The lowermost frame 8 consists of an annular collar-like metallic element having its under surface 12 slightly curved and the top surface 13 slightly curved, as shown, so as to give thickness and strength to the inner perimeter 14; the outer curved surface 13 deflects all drippings from the pot 11, or the above frames, to the water in the trough. The inner perimeter 14 forms an opening which cooperates with the other elements of the device to form the updraft flue 15. This frame 8 is supported on the top edge of the pan wall 3 by the spaced apart fin-like legs 16, all of which have their lowermost ends notched to receive the top edge of the wall 3 as shown. Ordinarily, only four of the legs 16 would be used so as to give the frame stability. In the top surface of the frame 8 are a plurality of spaced apart semi-spherical recesses or dowel-pin seats 17, four in number which are designed to receive the semi-spherical feet or dowel-like pins 18 of the frame 9 and support same above the frame 8. Fixed to the frame 8, just above each leg 16, is a fin-like metallic plate 19, which terminates at the top thereof into a straight edge 20.

Resting upon the frame 8, is the intermediate frame 9 which has the under curved and over curved surfaces like 12 and 13 of frame 8. The inner perimeter 21 of frame 9 forms an opening which continues the channel of the conically shaped flue 15. This frame 9 also has the recessed portions 17 to receive the feet or dowel-like pins 18 of the frame 10. Like frame 8, the frame 9 has a plurality of fin-like plates 22 spaced around the top surface of the frame and fixed thereto. The top edges of these plates 22 are straight and in alinement with the top edges of the plates 19.

Figure 2:
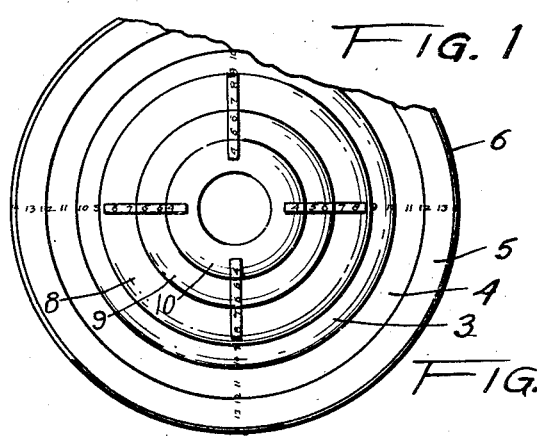
Fig. 2 is a plan view of Fig. 1 on a smaller scale, with the pot thereon removed, part of the figure being broken away.

The top frame 10 also has under and over curved surfaces 12 and 13 like frames 8 and 9, and an inner perimeter 23 which forms the boundary for the opening therein to complete the flue 15. A plurality of fin-like plates 24 are fixed to the top surface of the frame 10 and spaced apart around the top thereof, the straight top edges of the plates 24 being in alinement with the top edges of the plates 19 and 22. By this arrangement of all the plates, the top edges thereof form a large cross to support various sizes of pots, pans, etc. In order to aid one in centering the pans and pots upon the device, a series of numbers are employed. These numbers are impressed or formed into the metal of the tops of the plates, as shown in Fig. 2, so that, for instance, when a four inch pot is placed upon the top of the plates 19, 22 and 24, or pot rest, the sides of the pot should be at the four inch markings all around the pot rest. The numbers are shown only as high as 14 inches as it is not common to use pots having a diameter greater than 14 inches. The bottom edge of each frame is provided with serrations, or a series of notches or the like 25, so that heated air can escape from the central frustoconical air passage and rise along the outer surfaces of the device. These numerals are ½ in. apart as they count back from the center of the device and across to the outer edge of the trough. The lay-out of this measurement will be as an airline measurement and the numerals will be affixed to the dripper in four lines from the center opening thereof to its trough edge in the form of a cross as shown in Fig. 2. All dishes and pans placed on the device are centered perfectly by the numeral arrangement and the exact size of the dishes or pans is revealed at once by following with one's eye just where the edge of the dish, bottom edge, rests over the numerals. A seven inch dish spanning to the 7's marked on the fins, or a ten inch dish spanning to the 10's on the fins, would be a quick guide, allowing a quick calculation, in finding a dish's size and would be especially helpful to housewives to enable them to familiarize themselves as to the size and volumes of each dish and thus learn the number of serving portions in each dish that can be used upon the device of this invention.

Figure 3:
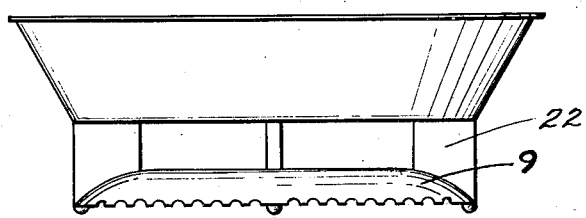
Fig. 3 is an elevational view of a part of the inventive device.
Figure 1:
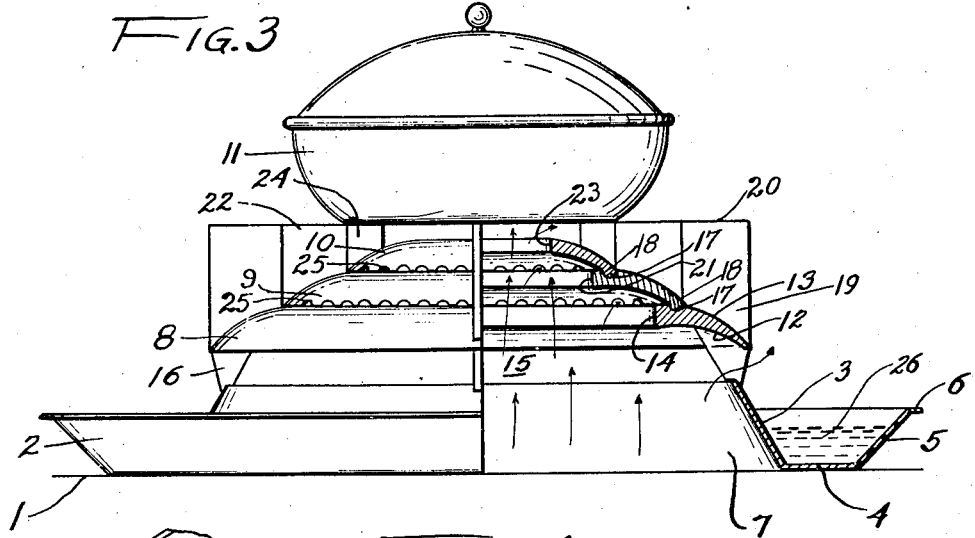
Fig. 1 is a vertical view of the invention, part thereof being shown in elevation and part in section.

The Figures 3 and 4 of the drawing are arranged one over the other in order to illustrate how the drippings or overflows from the cooking utensils will fall into the trough water 26 and not onto any of the hot parts of the stove. When the drippings fall into the hot water, they are retained by this water in a liquid or plastic state and will not burn so as to cause soot and smoke. Water evaporating from this water trough moistens the oven atmosphere, when the device is confined in an oven, and thus lessens the drying effect of the oven heat upon the contents being cooked in the utensil upon the device.

It is, of course, understood that various changes and modifications may be made in the details of construction and design of the above specifically described embodiment of this invention without departing from the spirit thereof, such changes and modifications being restricted only by the scope of the following claims:

Having thus described my invention, what is claimed as new and desired to be secured by Letters Patent is:

I claim:

1. A device for supporting cooking utensils and the like comprising a pan with a liquid receiving trough and having means therein to allow hot gases to pass upwardly therethrough, and supporting means at the top of the pan to provide a rest for the utensils, said supporting means comprising a series of superimposed reticulated elements having upstanding fins, the top edges of which form a level pan rest.

2. The device recited in claim 1 wherein the pan is shaped to provide an annularly configurated trough with a conically shaped opening at the center thereof, said trough extending on all sides of the device beyond the ends of all said fins.

3. A utensil supporting device for use over a heated area, the device comprising an annular pan with a central air channel therethrough, an annular collar-like frame having spaced apart legs thereunder which rest on the top of the pan in vertical spaced relation therewith, an air channel in the central portion of the frame, and similar collar-like frames superposed upon the first mentioned frame, and upstanding pot supporting means on each frame and unattached to each other.

4. The device recited in claim 3 wherein the pot supporting means have their top edges in alinement and form a cross so that the pot supporting means of each frame are in position for supporting a cooking utensil when one or more frames are removed.

5. A device for supporting cooking utensils and the like comprising a pan with a liquid receiving trough and having means therein to allow hot gases to pass upwardly therethrough, and supporting means at the top of the pan to provide a rest for the utensils, said supporting means comprising a plurality of superposed removable frames having central openings therein, a plurality of upstanding supporting means fixed to each of the frames and alined to form a dependable rest at the top thereof for cooking utensils and the like.

6. A device for supporting cooking utensils and the like comprising a pan with a liquid receiving trough and having means therein to allow hot gases to pass upwardly therethrough, and supporting means at the top of the pan to provide a rest for the utensils, the supporting means comprising a plurality of superposed removable frames having central openings therein, a plurality of upstanding supporting means fixed to each of the frames and alined to form a dependable rest at the tip thereof for cooking utensils and the like, a series of numbers on the top edges of the upstanding supporting means and along the inner surfaces of the trough, all in alinement, said numbers being in consecutive order and radiating from a central point of the device.

7. A device for supporting cooking utensils and the like comprising a pan with a liquid receiving trough and means therein to allow hot gases to pass upwardly therethrough, and supporting means at the top of the pan to provide a rest for the utensils, said supporting means comprising a series of superimposed reticulated frames having pan-supporting fins, each frame having a different size and arranged in step formation.

8. The device recited in claim 7 wherein all the frames are identically configurated and each one thereof has a large opening passing through the center thereof to allow free unobstructed and direct heat to rise from the bottom of the device to the top thereof.

RICHARD HOWARD.